(12) United States Patent
Lan

(10) Patent No.: US 12,004,134 B2
(45) Date of Patent: Jun. 4, 2024

(54) CONFIGURABLE RADIO FREQUENCY FILTER

(71) Applicant: T-Mobile USA, Inc., Bellevue, WA (US)

(72) Inventor: Wei-Ming Lan, Morrisville, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/930,966

(22) Filed: Jul. 16, 2020

(65) Prior Publication Data

US 2021/0076379 A1 Mar. 11, 2021

Related U.S. Application Data

(60) Provisional application No. 62/898,456, filed on Sep. 10, 2019.

(51) Int. Cl.
*H04W 72/0453* (2023.01)
*H04B 1/00* (2006.01)
*H04W 72/23* (2023.01)

(52) U.S. Cl.
CPC ........ *H04W 72/0453* (2013.01); *H04B 1/006* (2013.01); *H04W 72/23* (2023.01)

(58) Field of Classification Search
CPC ........ H04B 1/406; H04B 1/48; H04B 1/0057; H04B 1/006; H04B 1/44; H04B 1/525; H04B 1/0053; H04B 1/18; H04B 1/005; H04B 1/0458; H04B 1/0475; H04B 1/38; H04B 7/0608; H04B 1/3805; H04B 1/40; H04B 1/50; H04B 15/00; H04B 17/318; H04B 1/03; H04B 1/04

USPC .......................................................... 455/509
See application file for complete search history.

(56) References Cited

U.S. PATENT DOCUMENTS

| | | | |
|---|---|---|---|
| 7,187,913 B1 | 3/2007 | Rahn et al. | |
| 7,187,945 B2 | 3/2007 | Ranta et al. | |
| 9,118,302 B2 | 8/2015 | Shimizu et al. | |
| 9,288,031 B2 | 3/2016 | Rousu et al. | |
| 9,337,539 B1 | 5/2016 | Ananthanarayanan et al. | |
| 9,660,687 B2 | 5/2017 | Ella et al. | |
| 10,382,009 B2 | 8/2019 | Nosaka | |
| 10,681,560 B1* | 6/2020 | Sevindik | H04W 16/14 |
| 2002/0090974 A1* | 7/2002 | Hagn | H04B 1/48 |
| | | | 455/552.1 |
| 2005/0079847 A1* | 4/2005 | Arafa | H04B 7/0805 |
| | | | 455/562.1 |
| 2018/0041190 A1* | 2/2018 | Yoshimura | H03H 9/6409 |

(Continued)

*Primary Examiner* — Ajibola A Akinyemi
(74) *Attorney, Agent, or Firm* — Lee & Hayes, P.C.

(57) ABSTRACT

A configurable radio frequency filter is discussed herein. A device can include a filter component that includes multiple filters coupled between a radio frequency integrated circuit (RFIC) and one or more antennas via individual switches. A filter of the filter component may comprise a bandpass filter configured to pass specific frequencies. Filters of the filter component can comprise pass bands that are mutually exclusive or at least partially overlapping. A device can receive a channel allocation in a Citizens Broadband Radio Service (CBRS) band from a Spectrum Access System when initiating a carrier aggregated communication. In response to receiving the channel allocation, the device can select one or more filters of the filter component for filtering signals to and from an antenna component.

20 Claims, 6 Drawing Sheets

(56) References Cited

U.S. PATENT DOCUMENTS

2018/0048293 A1* 2/2018 Gathman ............. H03H 11/126
2018/0278276 A1* 9/2018 Leung ................. H04B 1/0053

* cited by examiner

CONFIGURABLE RADIO FREQUENCY FILTER

CROSS-REFERENCE TO RELATED APPLICATION

This application claims priority to a commonly owned U.S. Provisional Patent Application No. 62/898,456, filed on Sep. 10, 2019, and titled "5G TDD RF Filter Design for CBRS Band B48 and Any Other TDD Spectrum," which is herein incorporated by reference in its entirety.

BACKGROUND

Traditionally, service providers have obtained licenses to conduct wireless communications in a particular range of frequencies, and accordingly, have programmed base stations in a wireless network to use a fixed set of frequency resources. However, a number of user devices has grown over time, greatly increasing an amount of wireless traffic to be handled by the wireless networks.

The Citizens Broadband Radio Service (CBRS) enables shared wireless broadband use of the 3550-3700 megahertz (MHz) band (3.5 gigahertz (GHz) band). Historically, a portion of the CBRS band has been used by the United States Navy, satellite service providers, and utilities. However, the CBRS band has recently been availed for new commercial mobile uses.

CBRS is governed by a three-tiered spectrum authorization framework to accommodate a variety of commercial uses on a shared basis with incumbent users of the 3.5 GHz band. The three-tiered spectrum authorization framework provides Incumbent Access users priority access over Priority Access users, and Priority Access users priority access over General Authorized Access users. Incumbent Access users include authorized federal and grandfathered Fixed Satellite Service users. The Federal Communications Commission has implemented rules protecting such users from harmful interference from Priority Access and General Authorized Access users. That is, Incumbent Access users have priority access to the 3.5 GHz band. Priority Access users are granted access to the 3.5 GHz band via a Priority Access License assigned using competitive bidding within the 3550-3650 MHz portion of the 3.5 GHz band. General Authorized Access users are granted access via a licensed-by-rule, which permits open, flexible access to any portion of the 3550-3700 MHz band, so long as the portion of the 3550-3700 MHz band is not assigned to a higher tier (e.g., Incumbent Access or Priority Access). In some situations, access to the CBRS can be controlled, at least in part, by a Spectrum Access System (SAS), which may utilize rules to protect Incumbent Access uses and Priority Access users.

Devices that use the CBRS band must be configured to transmit or receive data within the wireless spectrum assigned to any such device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
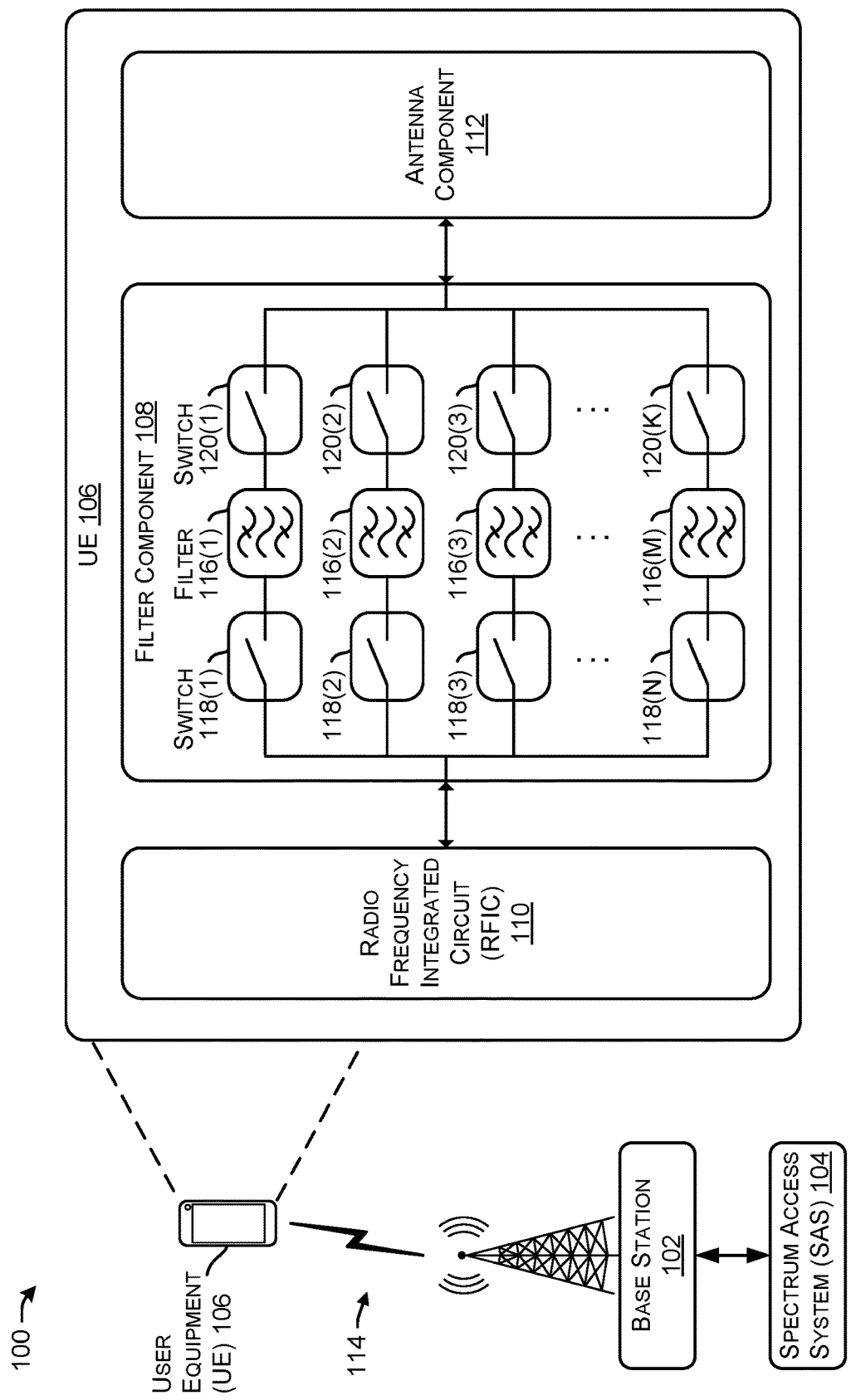
FIG. 1 is a block diagram of system including a base station, a spectrum access system, and a user equipment comprising a configurable radio frequency filter.

Described herein are components and techniques for using a configurable radio frequency filter for wireless communications. In some examples, a radio frequency front end (RFFE) can include a filter component that includes multiple filters coupled between a radio frequency integrated circuit (RFIC) and one or more antennas via individual switches. A filter of the filter component may comprise a bandpass filter configured to pass specific frequencies. Filters of the filter component can comprise pass bands that are mutually exclusive or at least partially overlapping.

When a user equipment (UE) or base station determines to initiate a carrier aggregated communication in the Citizens Broadband Radio Service (CBRS) band, the UE can receive data from a Spectrum Access System (SAS) comprising a channel allocation and can select one or more filters of the filter component for filtering signals to and from an antenna component. While discussed in the context of communications using the CBRS band, the filter component can be used in any wireless communications.

In some examples, the use of discrete filters improves the functioning of a wireless computing device by minimizing interference between adjacent channels of wireless spectrum by providing a "sharper" cutoff in the transition between a stop band and a pass band of the bandpass filter. Using discrete filters with a sharper cutoff (as opposed to a selectable or active bandpass filter) allows the UE to maximize an amount of spectrum to use for a communication by reducing size of a guard band. Further, using discrete filters associated with one or more wireless channels (as opposed to a relying solely on guard bands) can reduce interference between communications on adjacent channels.

In some examples, a pass band of individual filters of the filter component can be determined based at least in part on a number of wireless channels to be implemented in the wireless spectrum. In the context of implementing the filter component for a communication using the wireless spectrum associated with the CBRS band, the filter component can be configured with pass bands in the range of 3550 MHz-3700 MHz. In some examples, a channel in the CBRS band may comprise a 10 MHz frequency range, resulting in 15 discrete channels in the 150 MHz portion of spectrum. In an example where filters of the filter component comprise mutually exclusive pass bands, a first filter can comprise a pass band of 3550 MHz-3560 MHz, a second filter can comprise a pass band of 3560 MHz-3570 MHz, a third filter can comprise a pass band of 3570 MHz-3580 MHz, and so on. Thus, when a UE receives data from a SAS comprising a channel allocation, the UE can select an individual filter of the filter component based on the channel allocation for transmitting and receiving TDD (time-division duplexing) communications.

In some examples, filters of the filter component may comprise pass bands that at least partially overlap. In the context of a filter component configured for use in the CBRS band, a first filter can comprise a pass band of 3550 MHz-3570 MHz, a second filter can comprise a pass band of 3560 MHz-3580 MHz, a third filter can comprise a pass band of 3570 MHz-3590 MHz, and so on. Thus, a UE may use multiple adjacent channels without reserving a guard band between the adjacent channels, thereby increasing an amount of spectrum for wireless communications. In the context of using 10 MHz channels, a filter component configured to use two channels simultaneously can comprise filters with a 20 MHz pass band. Accordingly, a filter configured to use three, four, five, etc. number of adjacent channels can comprise pass bands of 30 MHz, 40 MHz, 50 MHz, etc., respectively. Of course, a size of individual pass bands may vary based on a size of individual channels and different sizes are contemplated within the scope of this disclosure.

As noted above, channels in the CBRS band may comprise a 10 MHz portion of spectrum. Further, that channel may be associated with a 250 kHz guard band at the lower end of the channel frequency and a 250 kHz guard band at the higher end of the channel frequency, leaving 9.5 MHz for wireless communication. In a case where a discrete filter is sized to use two channels for a communication (as opposed to using two filters each sized for a single channel), the filter sized for two channels allows the removal of the guard bands in the middle of the two channels, thereby increasing a number of frequencies that can be used for communications. Such a design may result in increased bandwidth and/or reduced interference with other adjacent channels.

In some examples, a filter component can comprise multiple filter components configured in parallel to optimize communications using one or more channels at the same time. For example, and in the context of a filter configured for use in the CBRS band with 10 MHz channels, a filter component can comprise a first filter component comprising 15 filters in parallel with individual filters configured with 10 MHz pass bands that are mutually exclusive. In some examples, this first filter component can be configured for using a single channel of a CBRS band for a communication. The filter component can further comprise as second filter component configured for communications allocated two adjacent channels. In this example, the second filter component can be configured with 14 filters in parallel with individual filters configured with 20 MHz pass bands that are partially overlapping. The filter component can further comprise a third filter component configured for communications allocated three adjacent channels, four adjacent channels, five adjacent channels, etc. Thus, a filter component can comprise any number of filter components configured for communications using any number of adjacent channels.

In some examples, a UE or base station may be configured to use frequencies in addition to those associated with the CBRS band. For example, a device may be configured to use low-band frequencies (e.g., 600 MHz (band 71), etc.), mid-band frequencies (e.g., 2500 MHz (band 41), CBRS band, etc.), and high-band frequencies (e.g., 26 GHz (band 258), 28 GHz (band 257), etc.). In such cases, the device may comprise multiple antennas configured for different frequencies. For example, a device may comprise a first antenna for low-band communication, a second antenna for mid-band communications, and a third antenna for high-band communications. Further, each antenna may be associated with filter components (e.g., configurable or fixed) for communications associated with each particular band. In some cases, multiple filter components may be coupled to an individual antenna.

In some examples, the filter components and techniques discussed herein may be used in any frequency ranges and are not limited to those expressly discussed herein. Further, the filter components and techniques may be used in accordance with protocols associated with one or more of 3G, 4G, 4G LTE, 5G protocols.

The filter components and techniques discussed herein may be implemented in any UE, base station, or device configured for wireless communications. The filter components and techniques can be use in carrier aggregation contexts, dual connectivity contexts, standalone (SA) implementations, non-standalone (NSA) implementations, licensed communications, unlicensed communications, and the like. The components and techniques may be used by or within a wireless telecommunications device, for example. Example implementations are provided below with reference to the following figures.

FIG. 1 is a block diagram of system 100 including a base station 102, a spectrum access system (SAS) 104, and a user equipment (UE) 106 comprising a configurable radio frequency filter (e.g., a filter component 108). The UE 106 can also include a radio frequency integrated circuit (RFIC) 110 and an antenna component 112, as well as other components discussed herein.

The base station 102 may be capable of transmitting and/or receiving data wirelessly using the CBRS band and/or other wireless frequencies discussed herein. Further, the base station 102 may be capable of transmitting and/or receiving data wirelessly using a first radio technology and a second radio technology. As used herein, the term "radio technology" can refer to a type, technique, specification, or protocol by which data is transmitted wirelessly. In some cases, a radio technology can specify which frequency bands are utilized to transmit data. For instance, a "5G radio technology" can refer to the NR standard, as defined by 3GPP. In some cases, a "4G radio technology" can refer to the LTE radio standard, as defined by 3GPP.

In particular examples, the base station 102 can utilize a 4G radio technology. The base station 102 may transmit and receive data via a connection 114 (e.g., at least one LTE radio link) that is defined according to frequency bands included in, but not limited to, a range of 450 MHz to 5.9 GHz. In some instances, the frequency bands utilized for the base station 102 can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE band 48 (e.g., 3500 MHz (the CBRS band)), LTE Band 50 (1500 MHz), LTE Band 51 (1500 MHz), LTE Band 66 (1700 MHz), LTE Band 70 (2000 MHz), LTE Band 71 (e.g., a 600 MHz band), LTE Band 74 (1500 MHz), and the like. In some examples, the base station 102 can be, or at least include, an eNodeB.

In some instances, the base station 102 can also utilize a 5G radio technology, such as technology specified in the 5G NR standard, as defined by 3GPP. In certain implementations, the base station 102 can transmit and receive communications with devices over the connection 114 (e.g., at least one NR radio link) that is defined according to frequency resources including but not limited to 5G Band 1 (e.g., 2080 MHz), 5G Band 2 (1900 MHz), 5G Band 3 (1800 MHz), 5G Band 4 (1700 MHz), 5G Band 5 (850 MHz), 5G Band 7 (2600 MHz), 5G Band 8 (900 MHz), 5G Band 20 (800 MHz), 5G Band 28 (700 MHz), 5G Band 38 (2600 MHz), 5G Band 41 (2500 MHz), NR Band 48 (e.g., 3500 MHz (the CBRS band)), 5G Band 50 (1500 MHz), 5G Band 51 (1500 MHz), 5G Band 66 (1700 MHz), 5G Band 70 (2000 MHz), 5G Band 71 (e.g., a 600 MHz band), 5G Band 74 (1500 MHz), 5G Band 257 (28 GHz), 5G Band 258 (24 GHz), 5G Band 260 (39 GHz), 5G Band 261 (28 GHz), and the like. In some embodiments, the base station 102 can be, or at least include, a gNodeB.

In some examples, and as noted above, the base station 102 may transmit in the CBRS band using 4G protocols and/or 5G protocols.

In some implementations, the base station 102 is part of a Non-Standalone (NSA) architecture. For instance, the base station 102 may include both a 4G transceiver (e.g., an eNodeB) by which the base station 102 can establish LTE radio link(s) and a 5G transceiver (e.g., a gNodeB) by which the base station 102 can establish NR radio link(s). In some cases, functions (e.g., transmission intervals, transmission power, etc.) of the 4G transceiver and the 5G transceiver are coordinated by the base station 102. In some examples, the base station 102 may include functionality to function as a Standalone (SA) architecture.

The base station 102 and/or the UE 106 may be capable of supporting 4G radio communications, such as LTE radio communications, and 5G radio communications, such as New Radio (NR) communications. In some examples, either or both of the base station 102 and the UE 106 may be configured to support at least one of enhanced Mobile Broadband (eMBB) communications, Ultra Reliable Low Latency Communications (URLLCs), or massive Machine Type Communications (mMTCs). In some instances, the one or more devices can include at least one device supporting one or more of a sensor network, voice services, smart city cameras, gigabytes-in-a-second communications, 3D video, 4K screens, work & play in the cloud, augmented reality, industrial and/or vehicular automation, mission critical broadband, or self-driving cars.

In some examples, the base station 102 can send a request for a channel allocation to the SAS 104 and can receive, at least partially in response to the request, a channel allocation for the UE 106. The base station 102 may send the request to the SAS 104 in response to an indication from the UE 106 (e.g., requesting a channel allocation in the CBRS band for carrier aggregation) or may do so absent a request from the UE 106 (e.g., so that the base station 102 may be pre-allocated one or more channels for a UE to use). The base station 102 can send data associated with a channel allocation to the UE 106 to configure the UE 106 to communicate using one or more channels indicated in the channel allocation.

As noted above, the UE 106 can include the filter component 108, the RFIC 110, and the antenna component 112. The UE 106 can configure the filter component 108 based at least in part on data indicative of a channel allocation from the SAS 104 to use a channel of the CBRS band.

The terms "user equipment (UE)," "user device," "wireless communication device," "wireless device," "communication device," "mobile device," and "client device," can be used interchangeably to describe any UE (e.g., the UE 106) that is capable of transmitting/receiving data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

Examples of UEs (e.g., the UE 106) can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of UEs include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

The filter component 108 may include one or more filters 116(1)-116(M) (also referred to generally as a filter 116) coupled to one or more switches 118(1)-118(N) (also referred to generally as a switch 118) and/or one or more switches 120(1)-120(K) (also referred to generally as a switch 120). In some examples, an individual filter 116 may be associated with (e.g., coupled to) one of a switch 118 or 120, or may be associated with (e.g., coupled to) both switches 118 and 120. If one of the switches 118 or 120 is omitted from the filter component 108 the removed switch can be coupled directly to the RFIC 110 or the antenna component 112.

In the context of implementing the filter component 108 for a communication using the wireless spectrum associated with the CBRS band, the filters 116(1)-116(M) can be configured with pass bands in the range of 3550 MHz-3700 MHz. In an example where a channel in the CBRS band comprises a 10 MHz frequency range, the filters 116 may comprise 15 filters to support 15 discrete channels in the 150 MHz portion of spectrum. Accordingly, the filter 116(1) can comprise a pass band of 3550 MHz-3560 MHz, the filter 116(2) can comprise a pass band of 3560 MHz-3570 MHz, the filter 116(3) can comprise a pass band of 3570 MHz-3580 MHz, and so on. Thus, a filter 116(15) (not shown) can comprise a pass band of 3690 MHz-3700 MHz.

When the UE 106 receives data from the SAS 104 (e.g., via the base station 102) comprising a channel allocation, the RFIC 110 can select an individual filter of the filter component 108 by controlling the switches 118 and/or 120 to couple a filter associated with the channel to the antenna component 112 and the RFIC 110, and to decouple filters not associated with the channel from the RFIC 110 and the antenna component 112. Accordingly, the UE 106 can use the allocated channel for transmitting and receiving TDD (time-division duplexing) communications.

In some examples, a device (e.g., the UE 106) can comprise a baseband processor that manages radio functionality and that processes LTE and 5G signaling. The device can also comprise an RF processor that is responsible for RF functions such as conversion between baseband digital signals and RF analog signals.

The RFIC 110 can include functionality to perform digital-to-analog (D/A) conversions analog-to-digital (A/D) conversion. The RFIC 110 can provide and receive RF signals corresponding to both 4G and 5G radio access technologies (e.g., LTE and NR).

The RFIC 110 may also include functionality to further amplify and/or filter RF Tx (transmit) and RF Rx (receive) signals. In some examples, the antenna component 112 may comprise multiple antennas such that individual antennas are used separately for transmit and receive operations. In some examples, the antenna component 112 can comprise multiple antenna for isolating communications using 4G and 5G protocols in the same or different frequency ranges. For example, a first antenna can transmit and/or receive 4G communications at low frequency and a second antenna can transmit and/or receive 5G communications at high frequency, or vice versa.

Figure 2:
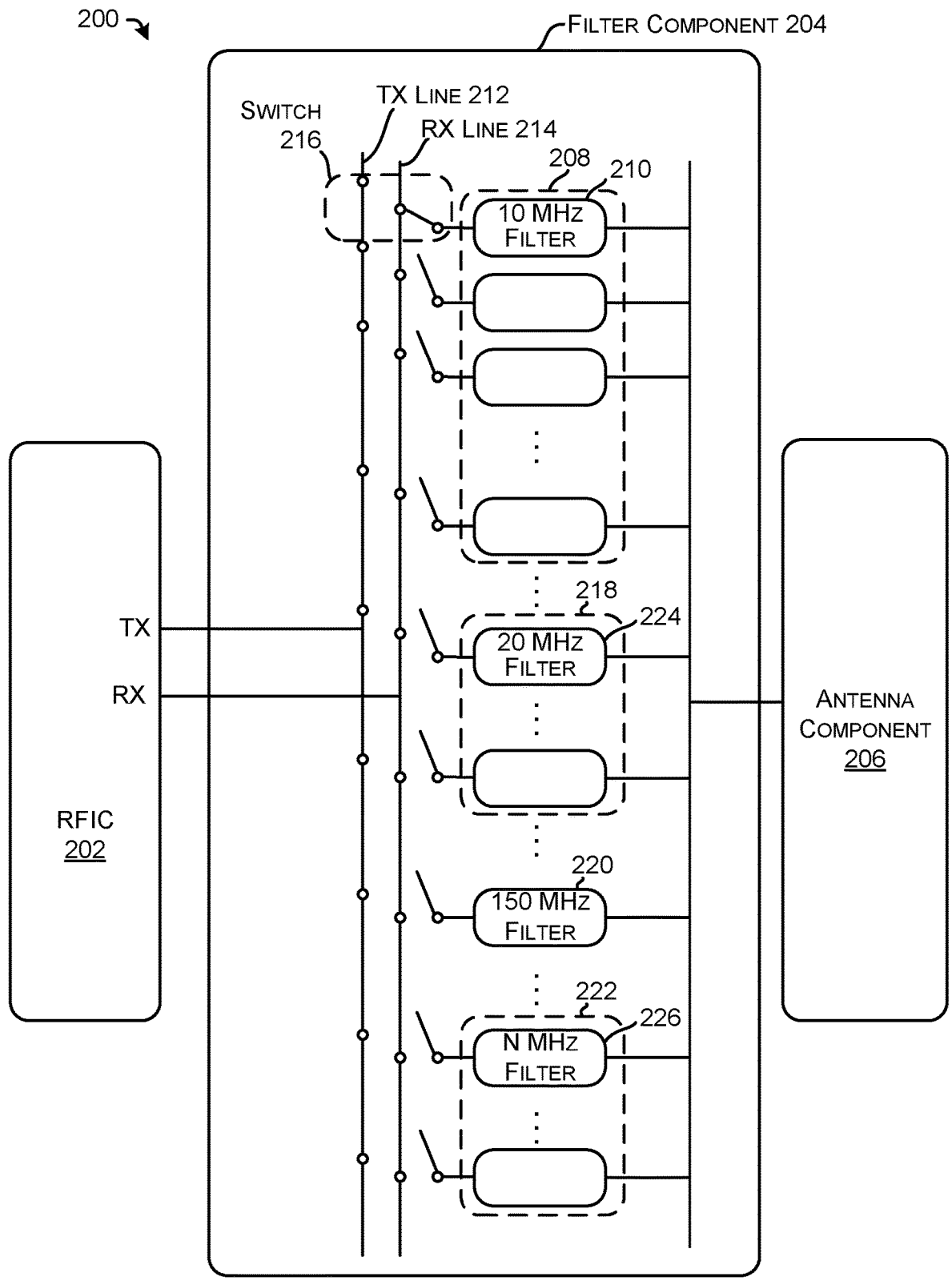
FIG. 2 is a block diagram of a device including another example configurable radio frequency filter.

FIG. 2 is a block diagram of a device 200 including another example configurable radio frequency filter. In some examples, the device 200 may correspond to the base station 102 or the UE 106 of FIG. 1.

The device 200 may include a RFIC 202, a filter component 204, and an antenna component 206. In some examples, the RFIC 202 may correspond to the RFIC 110 of FIG. 1. In some examples, the antenna component 206 can correspond to the antenna component 112 of FIG. 1.

The filter component 204 may comprise multiple configurable filter components in parallel to selectively couple the RFIC 202 to the antenna component 206 based on a channel allocation of one or more channels of the CBRS band (when implemented in the context of a CBRS band). For example, the filter component 204 comprises a filter component 208 comprising a plurality of bandpass filters. An example bandpass filter is illustrated as a filter 210. The filter 210 is coupled to the antenna component 206 and is selectively coupled to the RFIC 202 via one of a Tx (transmit) line 212 or a Rx (receive) line 214 via a switch 216. The filter 210 may also be decoupled from the RFIC 202 when a particular portion of spectrum is not to be used by the device 200. In some examples, the filter components may be coupled to the RFIC 202 and/or the antenna component 206 using more than one switch or with different configurations of switches.

The filter component 208 comprises a plurality of 10 MHz filters that represent 15 discrete channels of the CBRS band. Thus, one filter of the filter component 208 can be activated when a single channel of the CBRS band is allocated to the device 200. In some examples, the filter component 208 substantially corresponds to the filter component 108 of FIG. 1. Of course, a filter component may include more or fewer filters representing different sizes of pass bands.

The filter component 204 can also comprise filter components 218, 220, and 222. These filter components 218, 220, and 222 can be used when multiple adjacent channels of the CBRS band are allocated to the device 200 at the same time. For example, if two channels of the CBRS band are allocated to the device 200, a filter 224 of the filter component 218 can be coupled to the RFIC 202 to transmit and/or receive data in the particular wireless spectrum. The filter component 220 can be used if the SAS 104 allocates the entire CBRS band to the device 200, as the filter 220 is a bandpass filter associated with a pass band of 3550 MHz-3700 MHz.

The filter component 204 can be configured to include individual filter components with pass bands sized to accommodate more than one or two channels. Accordingly, a filter configured to use three, four, five, etc. number of adjacent channels can comprise pass bands of 30 MHz, 40 MHz, 50 MHz, etc., respectively. Of course, a size of individual pass bands may vary based on a size of individual channels and different sizes are contemplated within the scope of this disclosure.

Although specific examples of numbers of filters in component and sizes of pass bands are discussed herein, other examples are contemplated within the scope of this disclosure. For example, the filter component 222 can comprise any number of individual filters with any size pass band. Further the pass bands of individual filters of the filter component can be mutually exclusive or may partially overlap. As illustrated, the filter component 222 comprises a filter 226 with a pass band of N MHz.

Figure 3:
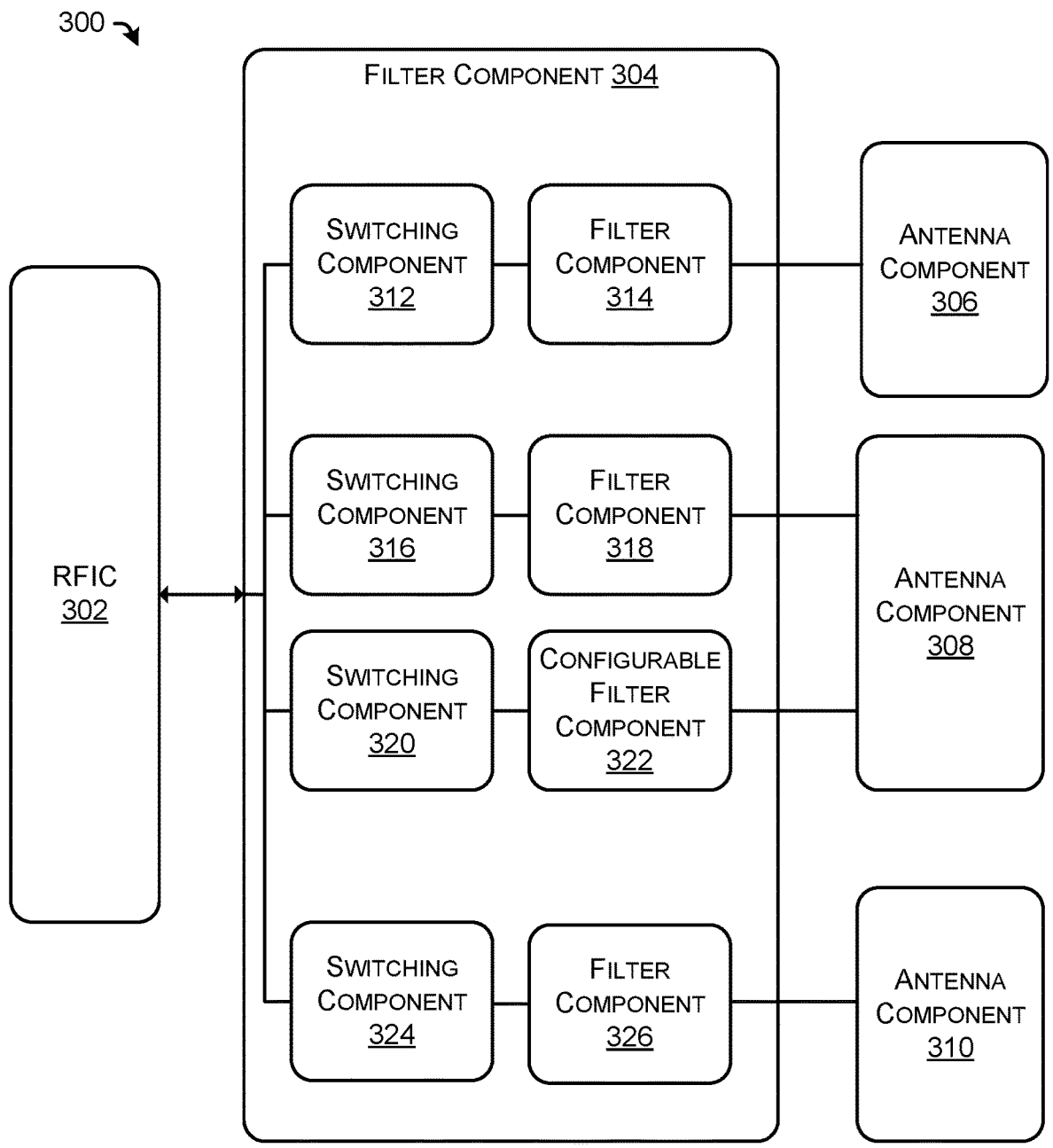
FIG. 3 is a block diagram of a device including another example configurable radio frequency filter, other filter components, and multiple antennas.

FIG. 3 is a block diagram of a device 300 including another example configurable radio frequency filter, other filter components, and multiple antennas. In some examples, the device 300 may correspond to the base station 102 or the UE 106 of FIG. 1.

The device 300 may include a RFIC 302, a filter component 304, and antenna components 306, 308, and 310. In some examples, the RFIC 302 may correspond to the RFIC 110 of FIG. 1. In some examples, the antenna component 306 can correspond to the antenna component 112 of FIG. 2.

As discussed herein, the device 300 may be configured to use frequencies in addition to those associated with the CBRS band. For example, the device 300 may be configured to use low-band frequencies (e.g., 600 MHz (band 71), etc.), mid-band frequencies (e.g., 2500 MHz (band 41), CBRS band, etc.), and high-band frequencies (e.g., 26 GHz (band 258), 28 GHz (band 257), etc.). In such an example, the antenna component 306 can be configured to transmit and receive low-band frequencies, the antenna component 308 can be configured to transmit and receive mid-band frequencies, and the antenna component 310 can be configured to transmit and receive high-band frequencies (also referred to as millimeter wave or mmWave frequencies).

The filter component 304 may include a switching component 312 configured to selectively couple the RFIC 302 to a filter component 314. The filter component 314 may include one or more fixed or configurable filters (as discussed herein) to facilitate communications over low-band frequencies via the antenna component 306.

The filter component 304 may further include a switching component 316 to selectively couple a filter component 318 to the antenna component 308. The filter component 318 may include one or more fixed or configurable filters (as discussed herein) to facilitate communications over mid-band frequencies via the antenna component 308. Further, a switching component 320 may selectively couple a configurable filter component 322 to the RFIC 302 to facilitate communication over mid-band frequencies via the antenna component 308. In some examples, the configurable filter component 322 can correspond to the filter component 204 of FIG. 2.

The filter component 304 may include a switching component 324 configured to selectively couple the RFIC 302 to a filter component 326. The filter component 326 may include one or more fixed or configurable filters (as discussed herein) to facilitate communications over high-band frequencies via the antenna component 310.

In some examples, the device 300 can conduct low-band, mid-band, and/or high-band communications individually or simultaneously in accordance with various techniques such as carrier aggregation, standalone implementations, non-standalone implementations, dual connectivity, and the like. For example, the device can use the low-band for a 5G communication and the mid-band for a 4G communication as a dual connectivity communication.

By way of example and without limitation, the device 300 can use carrier aggregation to use one or more channels in the CBRS band to supplement a communication anchored using Band 41. For example, the device 300 (e.g., a UE) can communicate with a base station using Band 41 and can send data indicative of a request for a channel allocation. The base station can send a query to a SAS (or may have a pre-allocated CBRS channel) and can send data indicative of a channel allocation to the UE in response to the request. In response to the channel allocation, the device 300 (e.g., the UE) can select a filter in the configurable filter component 322, as discussed herein, and can establish a communication via the allocated channel in the CBRS band. Thus, the device 300 can use the CBRS band to conduct a carrier aggregated communication using a wireless resource in Band 41 as well as the CBRS band. Although discussed in context of Band 41, it is understood that the CBRS band can be used in connection with other wireless resources, as discussed herein.

Figure 4:
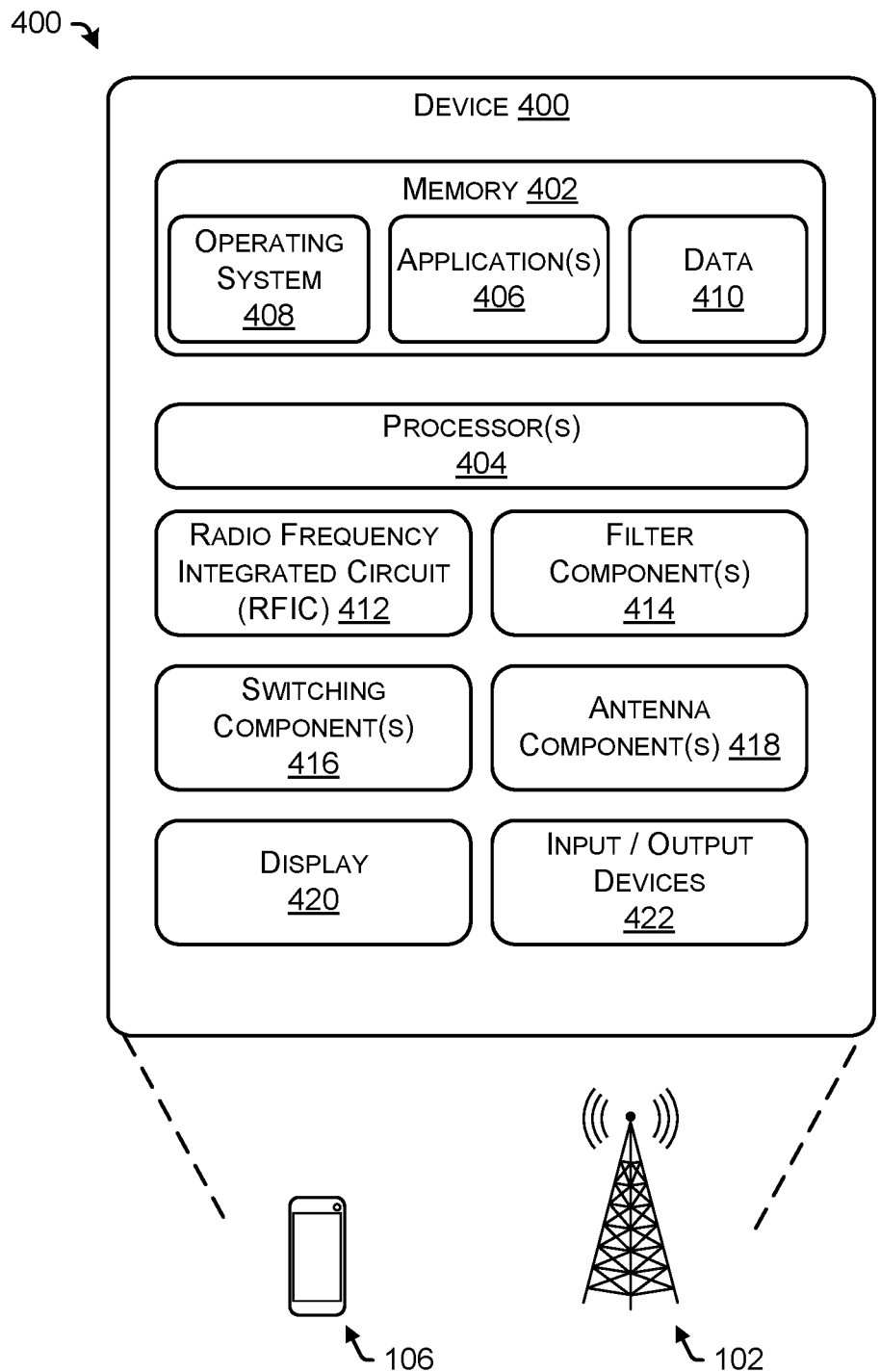
FIG. 4 is a block diagram of an example communication device.

FIG. 4 is a block diagram of an example communication device 400 that may be used to implement the techniques described herein. In some examples, the device 400 may implement the process 500 of FIG. 5 and the process 600 of FIG. 6, discussed below.

FIG. 4 shows only basic, high-level components of the device 400. Generally, the device 400 may comprise any of various types of cellular communication devices that are capable of wireless data and/or voice communications, including smartphones and other mobile devices, "Internet-of-Things" (IoT) devices, smart home devices, computers, wearable devices, entertainment devices, industrial control equipment, eNodeB, gNodeB, etc. In some environments, the device 400 may be referred to as a user equipment (UE) or a base station.

The device 400 may include memory 402 and a processor 404. The memory 402 may include both volatile memory and non-volatile memory. The memory 402 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 402 may include a SIM (subscriber identity module), which is a removable smart card used to identify a user profile (or user) of the device 400 to a service provider network.

The memory 402 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information. The memory 402 may in some cases include storage media used to transfer or distribute instructions, applications, and/or data. In some cases, the memory 402 may include data storage that is accessed remotely, such as network-attached storage that the device 400 accesses over some type of data communications network.

The memory 402 stores one or more sets of computer-executable instructions (e.g., software) such as programs that embody operating logic for implementing and/or performing desired functionality of the device 400. The instructions may also reside at least partially within the processor 404 during execution thereof by the device 400. Generally, the instructions stored in the computer-readable storage media may include various applications 406 that are executed by the processor 404, an operating system (OS) 408 that is also executed by the processor 404, and data 410 associated with the applications 406 and/or the operating system 408.

In some examples, the processor(s) 404 is a central processing unit (CPU), a graphics processing unit (GPU), both CPU and GPU, or other processing unit or component known in the art. Furthermore, the processor(s) 404 may include any number of processors and/or processing cores. The processor(s) 404 is configured to retrieve and execute instructions from the memory 402.

The device 400 may also include a radio frequency integrated circuit (RFIC) 412, filter component(s) 414, switching component(s) 416, antenna component(s) 418, a display 420, and input/output devices 422.

The RFIC 412 can comprise one or more baseband processors, an RF processor, A/D converter(s), D/A converters, and the like for providing control signals to the switching component(s) 416 and for processing signals for 4G and/or 5G signal transmission and reception.

The filter component(s) 414 can comprise one or more bandpass filters configured with pass bands associated with various wireless frequencies, as discussed herein. In some examples, a pass band associated with a filter can be associated with one or more channels of the CBRS band. In some examples, filters of the filter component can be selectively coupled to the antenna component(s) 418 and the RFIC 412 via the switching component(s) 416, as discussed herein. In some examples, filters of the filter component(s) 414 can be static filters or tunable filters. As discussed herein, the filter component(s) 414 may include multiple filter components in parallel to configure a pass band based on a number of channels allocated to the device. As discussed herein, a filter component can be selected or otherwise activated at least partially in response to a channel allocation from a SAS.

The switching component(s) 416 can be selectively activated to couple a filter of a filter component to the RFIC 412 and/or to the antenna component(s) 418. As illustrated and discussed herein, in some examples a switch of the switching component(s) 416 may be located between a RFIC and a filter component, and in some examples, a switch of the switching component(s) 416 may be located between a filter component and an antenna component. In some examples, a switch may be a single pull, double throw (SPDT) switch. In some examples, a switch may have three states: 1) an uncoupled state; 2) coupled to a transmit line; and 3) coupled to a receive line. However, other configurations of the switching component(s) 416 are contemplated within the scope of this disclosure.

The antenna component(s) 418 may comprise one or more antennas for transmitting and/or receiving wireless communications. For example, the antenna component(s) 418 may comprise a first antenna for low-band communication, a second antenna for mid-band communications, and a third antenna for high-band communications. As discussed herein, the antenna component(s) 418 may be selectively coupled to a RFIC and a filter component via a switching component. Further, each antenna may be associated with filter components (e.g., configurable or fixed) for communications associated with each particular band. In some cases, multiple filter components may be coupled to an individual antenna.

The device 400 may have a display 420, which may comprise a liquid crystal display, light emitting diode display, or any other type of display commonly used in telemobile devices or other portable devices. For example, the display 420 may be a touch-sensitive display screen, which may also act as an input device or keypad, such as for providing a soft-key keyboard, navigation buttons, or the like.

The device 400 may have input and output devices 422. These devices may include any sort of output devices known in the art, such as a display (already described as display 420), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Figure 5:
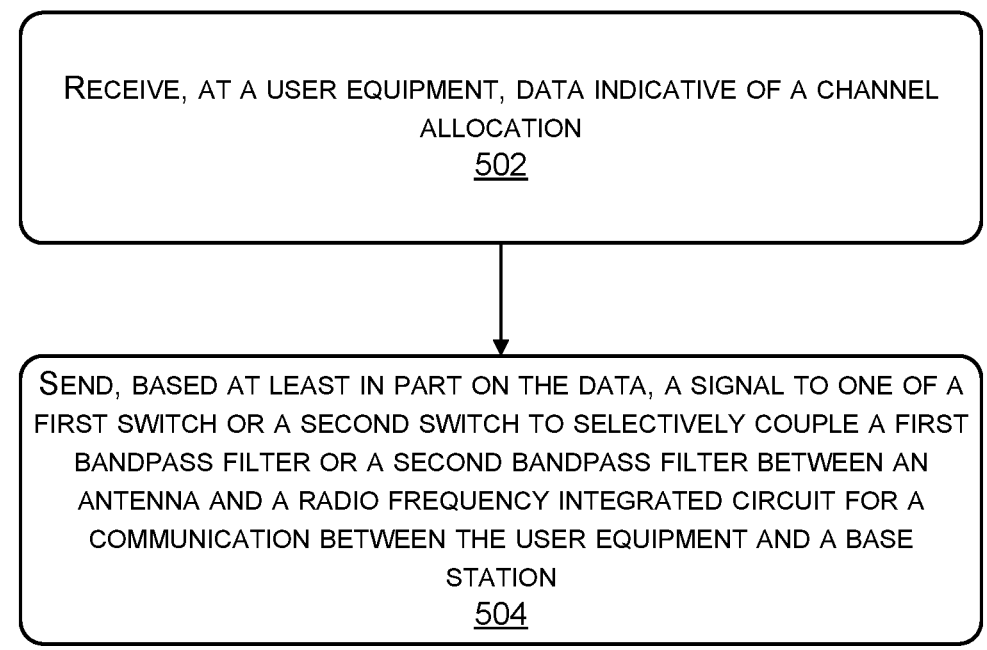
FIG. 5 illustrates an example process for configuring a configurable radio frequency filter for use in a user equipment.
Figure 6:
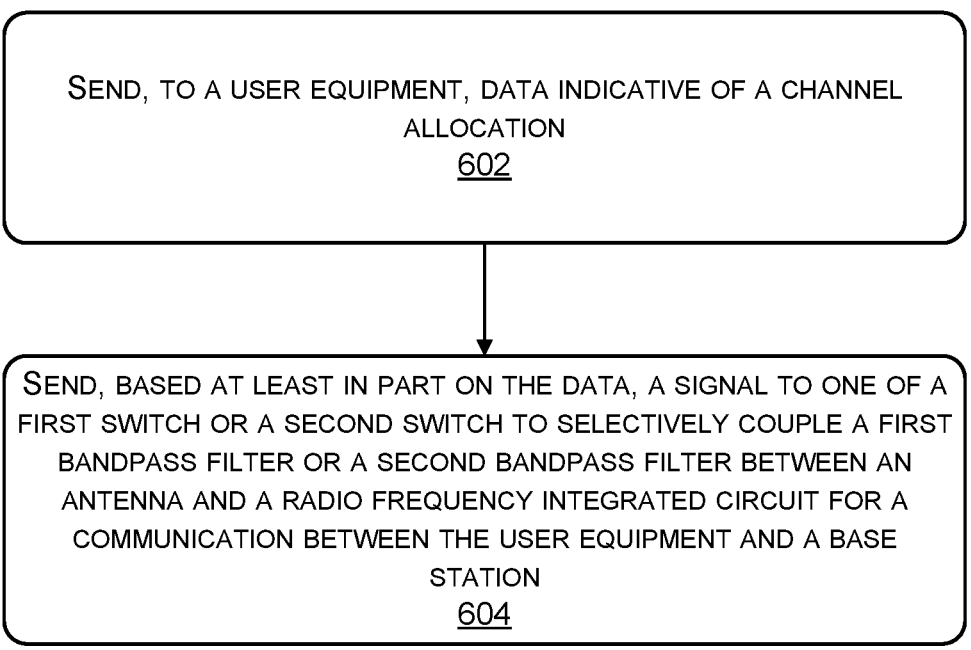
FIG. 6 illustrates an example process for configuring a configurable radio frequency filter for use in a base station.

FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 5 illustrates an example process for configuring a configurable radio frequency filter for use in a user equipment. The example process 500 can be performed by the UE 106, the devices 200, 300, 400, or another component or device as discussed herein.

At operation 502, the process can include receiving, at a user equipment, data indicative of a channel allocation. In some examples, the data can be received at least partially in response to a request for a channel allocation. For examples, a UE can send a channel request to a base station or SAS. If the request is directed to the base station, the base station can forward the request to a SAS or send another request to the SAS based on the request. The SAS can provide a channel allocation, which can be received by the UE in accordance with this operation. The data may specify one or more channels of the CBRS band that are allocated to the UE. In some examples, the data indicative of the channel allocation can be received via a wireless resource (e.g., a wireless frequency band or radio access technology) that is different than the wireless resource associated with the channel allocation.

At operation 504, the process can include sending, based at least in part on the data, a signal to one of a first switch or a second switch to selectively couple a first bandpass filter or a second bandpass filter between an antenna and a radio frequency integrated circuit for a communication between the user equipment and a base station. For example, the first bandpass filter may be associated with one or more first CBRS channels and the second bandpass filter may be associated with one or more second CBRS channels that are different than the first channel. In some examples, the one or more first CBRS channels are mutually exclusive of the one or more second CBRS channels, although in some examples the one or more first CBRS channels at least partially overlap the one or more second CBRS channels. In some examples, a RFIC can send the signal to the first switch or the second switch, although operations may be performed by various components of a device.

FIG. 6 illustrates an example process for configuring a configurable radio frequency filter for use in a base station. The example process 600 can be performed by the base station 102, the devices 200, 300, 400, or another component or device as discussed herein.

At operation 602, the process can include sending, to a user equipment, data indicative of a channel allocation. In some examples, the data can be sent at least partially in response to a request for a channel allocation. For example, a base station can receive a channel request from the UE. In some examples, the base station can forward the request to a SAS or send another request to the SAS based on the request. In some examples, a base station can request a channel allocation in the absence of a specific request from a UE to pre-allocate one or more channels to the base station (e.g., based on expected wireless bandwidth demands). The SAS can provide a channel allocation, which can be received by the base station and sent to a UE in accordance with this operation. The data may specify one or more channels of the CBRS band that are allocated to the UE. In some examples, the data indicative of the channel allocation can be received via a wireless resource (e.g., a wireless frequency band or radio access technology) that is different than the wireless resource associated with the channel allocation.

At operation 604, the process can include sending, based at least in part on the data, a signal to one of a first switch or a second switch to selectively couple a first bandpass filter or a second bandpass filter between an antenna and a radio frequency integrated circuit for a communication between the user equipment and a base station. In some examples, the operation 604 can be performed by the base station to configure the base station to communicate with the UE based at least in part on the one or more channels allocated to the UE.

Although features and/or methodological acts are described above, it is to be understood that the appended claims are not necessarily limited to those features or acts. Rather, the features and acts described above are disclosed as example forms of implementing the claims.

What is claimed is:
1. A system comprising:
a first antenna configured for low-band communication operating in 600 MHz frequencies;
a second antenna configured for mid-band communication operating in 2500 MHz frequencies;
a third antenna configured for high-band communication operating in 26 GHz and 28 GHz frequencies;
a radio frequency integrated circuit (RFIC);
a first bandpass filter selectively coupled between at least one of the first antenna, the second antenna, or the third antenna and the RFIC via a first switch, wherein the first bandpass filter is associated with a first frequency range and comprises at least one of a configurable filter or a fixed filter;
a second bandpass filter selectively coupled between at least one of the first antenna, the second antenna, or the third antenna and the RFIC via a second switch, wherein the second bandpass filter is associated with a second frequency range that is adjacent to the first frequency range or at least partially overlaps the first frequency range;
one or more processors; and
one or more non-transitory computer-readable media storing computer-executable instructions that, when executed, cause the one or more processors to perform operations comprising:
receiving data indicative of a channel allocation; and
sending, based at least in part on the data, a signal to one of the first switch or the second switch to selectively couple either the first bandpass filter or the second bandpass filter between at least one of the first antenna, the second antenna, or the third antenna and the RFIC for a communication between the system and a base station, wherein the communication is a time-division duplexing (TDD) communication.

2. The system of claim 1, the operations further comprising:
receiving the data from a Spectrum Access System (SAS).

3. The system of claim 1, wherein the first bandpass filter and the second bandpass filter are associated with a first wireless resource, the operations further comprising:
sending, via a second wireless resource that is different from the first wireless resource, a request for the channel allocation;
receiving the data in response to the request; and
establishing the communication as a carrier aggregated communication using the first wireless resource and the second wireless resource.

4. The system of claim 3, wherein the first wireless resource is associated with a Citizens Broadband Radio Service (CBRS).

5. The system of claim 1, wherein the low-band is associated with band 71, the mid-band is associated with band 41, and the high-band is associated with band 258 and band 257.

6. The system of claim 1, wherein the mid-band is associated with a Citizens Broadband Radio Service (CBRS).

7. The system of claim 1, wherein the first antenna is associated with transmitting operations and at least one of the second antenna or the third antenna is associated with receiving operations.

8. The system of claim 1 wherein the first antenna is associated with 4G communications and at least one of the second antenna or the third antenna is associated with 5G communications.

9. The system of claim 1, further comprising a third bandpass filter coupled between at least one of the first antenna, the second antenna, or the third antenna and the RFIC via a third switch.

10. The system of claim 1, wherein the first bandpass filter comprises a configurable filter.

11. The system of claim 1, wherein the first bandpass filter comprises a fixed filter and the second bandpass filter comprises a configurable filter.

12. A method comprising:
receiving data indicative of a channel allocation; and
sending, based at least in part on the data, a signal to one of a first switch or a second switch to selectively couple either a first bandpass filter or a second bandpass filter between at least one of a first antenna configured for low-band communication, a second antenna configured for mid-band communication, or a third antenna configured for high-band communication and a radio frequency integrated circuit (RFIC) for a communication between a user equipment and a base station, the communication being a time-division duplexing (TDD) communication and the user equipment including the first antenna, the second antenna, and the third antenna,
wherein the low-band communication is associated with band 71, the mid-band communication is associated with band 41, and the high-band communication is associated with band 258 and band 257,
wherein the first bandpass filter comprises a configurable filter that is associated with a first frequency range and the second bandpass filter is associated with a second frequency range that is adjacent to the first frequency range or at least partially overlaps the first frequency range.

13. The method of claim 12, further comprising:
receiving the data from a Spectrum Access System (SAS).

14. The method of claim 12, wherein:
the data is first data,
the channel allocation is a first channel allocation,
the signal is a first signal, and
the communication is a first communication,
the method further comprising:
receiving second data indicative of a second channel allocation; and
sending, based at least in part on the second data, a second signal to a third switch to selectively couple a third bandpass filter between at least one of the first antenna, the second antenna, or the third antenna and the RF IC for a second communication between the user equipment and the base station,
wherein a third frequency range associated with the third bandpass filter at least partially overlaps at least a portion of the first frequency range and the second frequency range.

15. The method of claim 12, wherein the first bandpass filter and the second bandpass filter are associated with a first wireless resource, the method further comprising:
sending, via a second wireless resource that is different from the first wireless resource, a request for the channel allocation;
receiving the data in response to the request; and
establishing the communication as a carrier aggregated communication using the first wireless resource and the second wireless resource.

16. The method of claim 12, further comprising:
determining that a data request is above a data threshold;
determining that a Citizens Broadband Radio Service (CBRS) resource is available for the communication; and
establishing the communication as a carrier aggregated communication.

17. A system comprising:
a first antenna configured for low-band communication;
a second antenna configured for mid-band communication that is associated with a Citizens Broadband Radio Service (CBRS);
a third antenna configured for high-band communication;
a radio frequency integrated circuit (RFIC);

a first bandpass filter selectively coupled between at least one of the first antenna, the second antenna, or the third antenna and the RFIC via a first switch, wherein the first bandpass filter is associated with a first frequency range and comprises a fixed filter;

a second bandpass filter selectively coupled between at least one of the first antenna, the second antenna, or the third antenna and the RFIC via a second switch, wherein the second bandpass filter is associated with a second frequency range that is adjacent to the first frequency range or at least partially overlaps the first frequency range and comprises a configurable filter;

one or more processors; and one or more non-transitory computer-readable media storing computer-executable instructions that, when executed, cause the one or more processors to perform operations comprising:

sending, to a user equipment, data indicative of a channel allocation; and sending, based at least in part on the data, a signal to one of the first switch or the second switch to selectively couple either the first bandpass filter or the second bandpass filter between at least one of the first antenna, the second antenna, or the third antenna and the RFIC for a communication between the system and the user equipment, wherein the communication is a time-division duplexing (TDD) communication.

18. The system of claim 17, the operations further comprising:
receiving the data from a Spectrum Access System (SAS).

19. The system of claim 17, wherein the first bandpass filter and the second bandpass filter are associated with a first wireless resource, the operations further comprising:
receiving, via a second wireless resource that is different from the first wireless resource, a request for the channel allocation;
sending the data in response to the request; and
establishing the communication as a carrier aggregated communication using the first wireless resource and the second wireless resource, wherein the first wireless resource is associated with a Citizens Broadband Radio Service (CBRS).

20. The system of claim 17, the operations further comprising:
receiving the channel allocation; and
determining to utilize the second bandpass filter based at least in part on the channel allocation and that the second bandpass filter comprises a configurable filter.

* * * * *